United States Patent Office 3,405,063
Patented Oct. 8, 1968

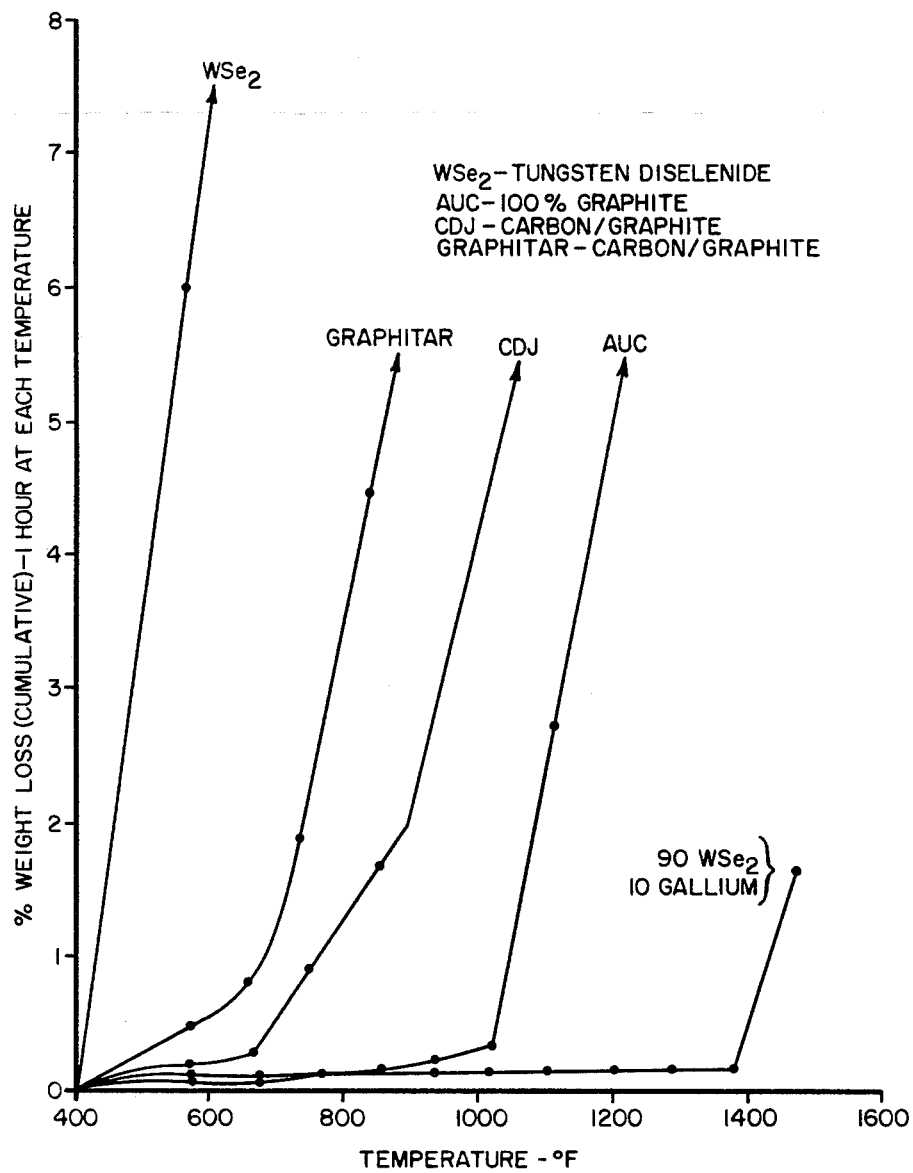

3,405,063
SOLID LUBRICANT COMPOSITION AND
PROCESS FOR ITS PREPARATION
David J. Boes, Monroeville, and Donald L. Dezzutti,
Penn Hills Township, Verona, Pa., assignors to Westinghouse Electric Corporation, Pittsburgh, Pa., a corporation of Pennsylvania
Filed Mar. 16, 1966, Ser. No. 534,822
14 Claims. (Cl. 252—12)

ABSTRACT OF THE DISCLOSURE

A solid lubricant including a heat reacted mixture of (1) gallium or gallium alloy such as gallium-indium, gallium-tin and gallium-indium-tin, and (2) powdered disulfide or diselenide solid lubricant such as tungsten diselenide, molybdenum diselenide, and tungsten disulfide.

---

This invention relates to solid lubricants. More particularly, it pertains to self-lubricating bodies having good mechanical strength and greatly improved oxidation resistance at high temperatures.

Scientific and industrial developments have created a need for reliable lubricants that are useful for very high temperature applications. Most conventional lubricants are useless above 750° F., because high temperature environments cause their evaporation, chemical decomposition, and/or oxidation.

Solid lubricants, such as graphite, molybdenum disulfide, and tungsten diselenide, are used extensively where temperatures in excess of 450° to 650° F. are encountered, because these lubricants exhibit far better oxidation stability than most conventional high temperature liquid lubricants such as silicones, polyphenyl ethers, and the like. Solid lubricant composites, such as molybdenum disulfide, tungsten disulfide, molybdenum diselenide, and tungsten diselenide, bonded with resinous binders, such as polytetrafluoroethylene, are known to decompose rapidly at temperatures exceeding 600° F. One of the products of oxidation of molybdenum disulfide resin composites for example, is an abrasive metal oxide or metal carbide. Likewise, graphite and graphite based composites which possess relatively good oxidation resistance at moderate temperatures are limited to a miximum useful temperature of about 750° F. Above that temperature level no suitable lubricants are available for long term use in air because the rate of oxidation increases rapidly.

Associated with the foregoing has been the difficulty of fabricating mechanically strong, load bearing surfaces using high concentrations of solid lubricants in a resinous matrix in order to take advantage of their low friction coefficients. A difficulty of fabrication has been that of degassing the solid lubricant composite during sintering operations. Frequently, the composite containing a resin binder cannot withstand temperatures as high as the pure solid lubricants alone can withstand.

It has been found in accordance with this invention that the foregoing problems may be overcome by providing an improved reliable solid lubricant which operates at temperatures ranging from —300° to 1500° F. both in oxidizing and in inert or vacuum atmospheres. The solid lubricant composition of this invention includes a heat reacted mixture of (1) gallium or a gallium alloy, such as gallium-indium, gallium-tin, and gallium-indium-tin, and (2) powdered disulfide or diselenide solid lubricant, such as tungsten diselenide, molybdenum diselenide, or tungsten disulfide.

Accordingly, it is an object of this invention to provide a solid lubricant composition and process which is usable at operating temperatures ranging from —300° to 1500° F.

It is another object of this invention to provide a process for making solid lubricant compositions which involves the mixing of solid lubricant powders with the element gallium or gallium alloys, and subjecting the mixture to a heat treatment cycle whereby the composition reacts and is sintered into a solid body suitable for use over a wide spectrum of operating conditions.

Finally, it is an object of this invention to provide a solid lubricant composition that accomplishes the foregoing objects and desiderata in a simple and effective manner.

These and other objects and advantages of the present invention will become more apparent when considered in view of the following detailed description and drawing which is a chart showing the oxidation characteristics of the improved solid lubricant compositions at varying temperatures.

In accordance with the present invention, solid lubricant bodies having superior mechanical strength and unexpected oxidation resistance at temperatures of from 300° up to 1500° F. comprise a reacted and sintered composite body of gallium or gallium base alloy and a solid disulfide or diselenide lubricant. The composite body is prepared by mixing an appropriate amount of molten gallium metal or an alloy thereof with the finely divided diselenide or disulfide solid lubricant powder until the liquid metal is absorbed, pressing the mixture to form a pellet or body, and subjecting the pellet to a curing cycle of progressively increasing temperatures whereby the components react and densify. A strong homogeneous solid member or body is produced. Thereafter, the body may be machined to dimension if it has not been cold pressed to desired dimensions before curing.

One of the ingredients is liquid gallium or a gallium base alloy such as gallium-indium, gallium-tin, or gallium-indium-tin, or mixtures thereof, where gallium comprises over 50% by weight of the alloy as well as an alloy of lead, bismuth, tin, and indium with or without small amounts of gallium substituted for lead. These alloys should be liquid at room temperature or moderately above for example, 125° F. The amount of gallium and/or gallium base alloy may vary from about 5 to 35 weight percent of the total ingredients and is preferably added in a molten condition by heating to its melting point of about 100° F.

The other ingredient is finely divided solid lubricant powder preferably selected from at least one of a group consisting of the disulfides and diselenides of tungsten, niobium, molybdenum, and tantalum. These compounds are tungsten diselenide, tungsten disulfide, molybdenum diselenide, molybdenum disulfide, niobium diselenide, niobium disulfide, tantalum diselenide, and tantalum disulfide. The solid lubricant may be present in amounts varying from 70 to 95 weight percent, and preferably 70 to 80 weight percent with an optimum of about 75 weight percent of the total ingredients. The solid lubricant is preferably in powder form having an average particle size ranging from 60 to —325 mesh.

The liquid metal and solid lubricant components used in practicing the present invention are preferably prepared by combining weighed proportions of the ingredients in a mixing container. After the ingredients are thoroughly blended and mixed until the liquid metal component is no longer evident, the mixture is charged into a die where it is compacted under a pressure which may vary from 5,000 to 100,000 p.s.i. and is preferably about 50,000 p.s.i. at room temperature to produce a solid body or pellet.

The compacted body is then subjected to a carefully regulated progressively increasing high temperature cure or heat treatment involving a three-phase cycle. In the first phase the pellet is heated for at least 1 to 24 hours at temperatures ranging from 300° to 500° F., a preferred time being 15 hours at 450° F. In the second phase the pellet is heated for 1 to 24 hours at a temperature ranging from 600° to 800° F., the preferred time being 8 hours at 700° F. In the third phase of the cure, the pellet is heated for 1 to 24 hours at a temperature ranging from 800° to 1100° F., the preferred time being 8 hours at 950° F.

The heat treating of the composition body may be carried out in a relatively continuous manner; that is, the body placed in a furnace with a neutral or non-oxidizing atmosphere such as argon, and heated at a progressively increasing temperature such that the body is in the temperature range of 300° to 500° F. for several hours; then the temperature is raised to 600° F., either slowly or rapidly, and the body being in the temperature range of 600° to 800° F. for several hours, and then in the temperature range of 800° F. and higher for several more hours. It is also feasible to interrupt the curing between the phases of the cycle, for example, to react the components initially at 300° to 500° F., and cooling to room temperature for instance, before reheating to 600° F. and higher.

The resultant heat cured compact or pellet is a hard non-porous member or body capable of being machined, drilled, or threaded. During curing, a chemical reaction occurs between the gallium and/or gallium alloy and the powdered solid lubricant to provide a member having compressive strengths ranging up to from 20,000 to 30,000 p.s.i. with $WSe_2$. During the curing or reaction cycle the components ($WSe_2$, Ga, and In for instance) undergo exothermic chemical reactions to form complexes of the components, the complete analysis of which is not presently known. The first phase of the reaction cycle in the temperature range of 300° to 500° F. initiates the reaction. In the second phase of the cycle in the temperature range of 600° to 800° F. the reaction is completed and the pellet now possesses excellent oxidation resistance. In the third phase of the cycle at 800° to 1100° F. the pellet achieves physical stability and is stabilized dimensionally.

If the first and second phases are omitted and reaction is carried out at 800° F. to 1100° F., the materials react vigorously in the third phase temperature range and the mass disintegrates into a body having small cracks throughout with resulting loss of strength. On the other hand, if the third phase of curing is omitted, the material exhibits an inordinate increase in thermal expansion when subsequent operating temperatures exceed the maximum temperature to which the material is exposed during the previous curing cycle.

The gallium or gallium alloy is molten to facilitate the mixing with the solid lubricant to obtain what appears to be in the nature of an amalgam. The preferred gallium-indium alloy contains 75 weight percent gallium and 25 weight percent indium. The gallium-tin alloy preferably contains 90 weight percent gallium and 10 weight percent tin. The gallium-indium-tin alloy preferably contains 20 weight percent gallium, 60 weight percent indium, and 20 weight percent tin. One or more of the foregoing alloys may be used to form 5 to 35 weight percent of the total mixture with the solid lubricant, the metal component being preferably 20 to 30 weight percent with an optimum of about 25%.

The preferred solid, lubricant compounds for the practice of the invention are $WSe_2$, $MOSe_2$, and $WS_2$, because they provide the best oxidation resistance properties of the group of solid lubricant at the higher temperatures of use such as up to 1500° F. The compounds $MOS_2$, $NbSe_2$, $TaSe_2$, $NbS_2$, $TaS_2$ give good results when employed in the temperature range of up to about 900° to 1000° F. The niobium and tantalum compounds are good electrically conductive lubricants in a vacuum and superior even to graphite for which reasons they may be used as brushes in direct current machinery.

The high temperature lubricating characteristics of these materials against type 440–C stainless steel are given in Table I.

TABLE I.—FRICTION-WEAR CHARACTERISTICS AGAINST 440-C STAINLESS HOHMAN TESTER-AIR ATMOSPHERE

| Material | Temp., °F. | Load, p.s.i. | Speed, f.p.m. | Running time, min. | Friction coef. | Wear mm. |
|---|---|---|---|---|---|---|
| 90 $WS_2$–10 Ga | 70 | 80 | 230 | 60 | .18 | 1.9 |
| 90 $WS_2$–10 Ga | 940 | 80 | 230 | 60 | .25 | 3.4 |
| 80 $WS_2$–20 Ga | 70 | 80 | 230 | 60 | .10 | 1.8 |
| 80 $WS_2$–20 Ga | 940 | 80 | 230 | 60 | .28 | 2.8 |
| 70 $WS_2$–30 Ga | 70 | 80 | 230 | 60 | .14 | 2.2 |
| 70 $WS_2$–30 Ga | 940 | 80 | 230 | 60 | .22 | 2.4 |
| 90 $WSe_2$–10 Ga | 70 | 80 | 230 | 60 | .21 | 2.2 |
| 90 $WSe_2$–10 Ga | 940 | 80 | 230 | 40 | .45 | 3.5 |
| CDJ Carbon-graphite | 70 | 80 | 230 | 60 | .24 | 1.4 |
|  | 940 | 80 | 230 | 60 | .88 | 3.3 |

The tests were made using various compositions running against type 440 C stainless steel which is one of the most difficult materials to lubricate. As shown in Table I, the compositions having 20 and 30 weight percent gallium exhibit less wear and substantially lower friction coefficients than the CDJ carbon-graphite which is one of the best high temperature materials available at the present time.

The lubricating characteristics for the materials against type 304 stainless steel at higher loads is shown in Table II.

TABLE II.—FRICTION-WEAR CHARACTERISTICS AGAINST 304 STAINLESS-ROOM TEMP. HYDROSTATIC TESTER-70 f.p.m.

| Material, WK percent | Load, p.s.i. | Friction coef. | Wear, gms./hr. |
|---|---|---|---|
| 90 $WSe_2$–10 Ga | 530 | .04 | .006 |
| 90 $WSe_2$–10 Ga | 940 | .07 | .006 |
| 80 $WSe_2$–20 Ga | 530 | .02 | .006 |
| 80 $WSe_2$–20 Ga | 940 | .04 | .009 |
| 90 $WS_2$–10 Ga | 530 | .01 | .008 |
| 90 $WS_2$–10 Ga | 940 | .01 | .004 |
| 10 $WSe_2$–20 PTFE–70 Ag [1] | 530 | .10 | .003 |
| 10 $WSe_2$–20 PTFE–70 Ag [1] | 940 | .11 | .002 |

[1] vol., percent.

In the drawing, the compound or allow containing 90 weight percent $WSe_2$ and 10 weight percent gallium is compared with the oxidation characteristics of other solid lubricants at various temperatures. Cumulative percent weight loss per 1 hour at each temperature is shown graphically in the drawing for tungsten diselenide, AUC (100% graphite), CDJ (carbon/graphite), and graphitar (carbon/graphite). It is evident that the cured compound containing tungsten diselenide and gallium has excellent oxidation resistance characteristics up to a temperature of about 1500° F.

One advantage of the technique of this invention is the fabrication from solid lubricant powders of compacts with good mechanical strength and greatly improved oxidation resistance. Solid lubricant compacts formed in this way exhibit low wear characteristics and excellent friction coefficients under operating conditions which they could not previously tolerate. Materials formed in accordance with the present invention offer possibilities for use as self-lubricating seals and in sleeve bearing applications not only in a high temperature-air environment, but also are suitable for use over a wide spectrum of operating conditions, such as at cryogenic temperatures, under ultra-high vacuum, and at high radiation levels. Furthermore, because of the materials excellent ability to withstand severe thermal shock, the technique may provide a means for imparting improved mechanical strength and oxidation resistance to thermoelectric materials.

The consolidated materials of the present invention are excellent for use as cages in ball bearings wherein the rotating bearings contact the cage and are coated with the compound material which in turn is carried to the inner surfaces of the races between which the bearings rotate in a conventional manner.

Where lower operating temperatures are indicated but there is a need for high strength, a self-lubricating composite of modified composition may be used. Gallium or gallium-indium alloys having up to 40% indium may be mixed in quantities of from 80 to 96% weight with finely divided silver or copper powder or base alloys thereof, and with or without a distribution of a finely divided resin such as polytetrafluoroethylene, (PTFE), and with or without the sulfide or selenide solid lubricant. The resulting mixture is hot pressed to form solid lubricant composites having very desirable tensile strengths. The PTFE resin may comprise 40% of the composite. For example, a mixture including 95 weight percent silver and 5 weight percent gallium-indium alloy (75 weight percent gallium and 25 weight percent indium) may be thoroughly mixed and hot pressed at a temperature ranging from 25,000 to 100,000 p.s.i., the ultimate pressure being 60,000 p.s.i. Such a solid lubricant composite has a tensile strength of at least 10,000 p.s.i.

Another example may include a mixture of 90 weight percent silver and 10 weight percent gallium indium (75 weight percent gallium and 25 weight percent indium) which forms 85 volume percent of the total composition to which 15 volume percent of PTFE is added. The resulting mixture is hot pressed at the indicated temperatures and pressures which result in a solid lubricant composite having a tensile strength of 3450 p.s.i.

These and other composites are listed in Table III as follows:

Table IV includes composites in which 100% silver or copper is used instead of the silver-mercury amalgam. Comparisons of the friction wear and tensile properties are included.

The self-lubricating composite listed in Tables III and IV have satisfactory tensile strengths for most purposes and are useful as load-bearing surfaces up to temperatures of 600° F.

Although polytetrafluoroethylene is used in the foregoing examples listed in Tables III and IV it is understood that other resins such as nylon-6 may also be used. Where resins are used in solid lubricant mixture cannot be sintered at higher temperatures such as for the solid lubricants listed in Tables I and II.

Accordingly, the present invention provides solid lubricant composites or alloys which may be used in a wide temperature range from −300° to 1500° F. This invention is particularly directed to solid lubricants which are useful in the temperature range from 600° to 1500° F. where tungsten diselenide, tungsten disulfide, and molybdenum diselenide powders are reacted with gallium indium, gallium tin, and gallium indium-tin alloys.

Various modifications may be made within the spirit of the invention.

What is claimed is:

1. A self-lubricating solid body having oxidation resistance at temperatures ranging from −300° to 1500° F. comprising a sintered composite product derived by progressively heating from 300° F. to 500° F. to from 800° F. to 1100° F., an intimate mixture of from 5 to 35% by weight of a low melting metal selected from a group consisting of gallium and alloys of gallium with indium, tin, and bismuth, and the balance being a solid lubricant selected from at least one of the group consisting of sulfides and selenides of tungsten, molybdenum, niobium, and tantalum.

2. The body of claim 1 in which the low melting metal is composed of 75 weight percent gallium and 25 weight percent indium.

TABLE III.—PHYSICAL PROPERTIES OF GALLIUM-INDIUM COMPOSITES

| Pellet No. | Composition, vol. percent | Alloy, wt. percent | PTFE particle size | Tensile strength, p.s.i. | 500 p.s.i. | | 1,000 p.s.i. | |
|---|---|---|---|---|---|---|---|---|
| | | | | | Friction | Wear, gm./hr. | Friction | Wear, gm./hr. |
| 1 | 100% alloy | 95 Ag 5 Ga In | | 10,700 | | | | |
| 2 | do | 87 Ag 13 Ga In | | 10,450 | | | | |
| 3 | do | 95 Cu 5 Ga In | | 8,450 | | | | |
| 4 | do | 87 Cu 13 Ga In | | 5,150 | | | | |
| 5 | 85 alloy 15 PTFE | 95 Ag 5 Ga In | 100 mesh | 1,650 | 0.20 | .001 | 0.30 | 0.002 |
| 6 | do | 90 Ag 10 Ga In | do | 3,450 | 0.20 | .001 | 0.25 | 0.002 |
| 7 | do | 80 Ag 20 Ga | Sub-micron | 2,800 | 0.11 | .001 | | |
| 8 | 80 alloy 20 PTFE | 95 Ag 5 Ga In | 100 mesh | 2,000 | 0.21 | .001 | 0.22 | 0.002 |
| 9 | 75 alloy 22 PTFE 3 WS₂ | do | do | | 0.17 | <0.001 | 0.13 | 0.001 |
| 10 | 70 Ag 20 PTFE 10 WSe₂ | | do | 600 | 0.10 | .003 | 0.11 | 0.002 |

Other solid lubricant composites may also be provided in which an alloy including silver and mercury is mixed with PTFE and/or a solid lubricant taken from the group including tungsten diselenide and niobium diselenide to form composite amalgams having very desirable friction, wear, and tensile strengths. For that purpose, the weight percent of silver may vary from 52 to 80% and the amount of mercury may vary from 20 to 48%.

Comparisons of the properties of several composite amalgams are shown in Table IV.

3. The body of claim 1 in which the low melting metal consists of 90 weight percent gallium and 10 weight percent tin.

4. The body of claim 1 in which the low melting metal consists of 20 weight percent gallium, 60 weight percent indium, and 20 weight percent tin.

5. The body of claim 1 in which the solid lubricant is selected from one of a group consisting of tungsten diselenide, tungsten disulfide, and molybdenum diselenide.

TABLE IV.—FRICTION-WEAR-TENSILE STRENGTHS OF COMPOSITE AMALGAMS

| No. | Composition, vol. percent | | | Alloy composition, wt. percent | 70 f.p.m. | | | | Tensile, p.s.i. | Hardness-R_H, machined surface |
|---|---|---|---|---|---|---|---|---|---|---|
| | Metal | PTFE | WSe₂ | | 530 p.s.i. | | 940 p.s.i. | | | |
| | | | | | Friction | Wear, gm./hr. | Friction | Wear, gm./hr. | | |
| 1 | 85 | 15 | (¹) | 80 Ag-20 Hg | .12 | .0004 | .12 | .0004 | 6850 | 94-96 |
| 2 | 85 | 15 | (²) | 80 Ag-20 Hg | .12 | .002 | .11 | .002 | 4800 | 96-98 |
| 3 | 85 | 15 | (³) | 80 Ag-20 Hg | .12 | .004 | .12 | .008 | 4000 | 100+ |
| 4 | 80 | | (⁴) | 80 Ag-20 Hg | .19 | .003 | .18 | .006 | | |
| 5 | 80 | 10 | 10 | 52 Ag-48 Hg | .16 | .030 | .12 | .012 | | |
| 6 | 70 | 20 | 10 | 100% Silver | .10 | .003 | .11 | .002 | 660 | 45-50 |
| 7 | 60 | 30 | 10 | 100% Copper | .22 | .0004 | .18 | .0004 | 1000 | 55-60 |

¹ Silver, 50%, 325 mesh, 50%, micron size; PTFE, 100%, 100 mesh.
² Silver, 100% micron size; PTFE, 100% coarse.
³ Silver, 100% micron size; PTFE, 100% micron size.
⁴ NbSe, 200 mesh.

6. The body of claim 1 in which the low melting metal consists of 5 to 30 weight percent of the body, and the solid lubricant from 70 to 95 weight percent.

7. The body of claim 6 in which the low melting metal consists of 20 to 30 weight percent of the body, and the solid lubricant from 70 to 80 weight percent.

8. The body of claim 7 in which the low melting metal consists of about 25 weight percent of the body, and the solid lubricant consists of 75 weight percent.

9. A method for preparing a sintered lubricant body having good mechanical strength and excellent oxidation resistance in a temperature range of from −300° to 1500° F. comprising the steps of mixing a low melting metal selected from a group consisting of gallium and alloys of gallium with tin, indium, bismuth, and mixtures thereof, with a finely divided lubricant powder selected from at least one of the group consisting of the disulfides and diselenides of tungsten, molybdenum, niobium, and tantalum; compacting the mixture at a pressure of from about 10,000 to 100,000 p.s.i. into a pellet; heating the pellet at a temperature that is in the range of from 300° to 50° F. for at least 1 hour; at a temperature in the range of from 600° to 800° F. for at least 1 hour; and at a temperature in the range of 800 to 1100° F. for at least 1 hour.

10. The method of claim 9 in which the low melting metal is selected from one of the group consisting of an alloy containing 75 weight percent gallium and 25 weight percent indium, 90 weight percent gallium and 10 weight percent tin, 20 weight percent gallium, 60 weight percent indium and 20 weight percent tin, and mixtures thereof; and in which the solid lubricant powder consists of at least one compound selected from a group consisting of stoichiometric compounds of tungsten diselenide, tungsten disulfide, and molybdenum diselenide.

11. The method of claim 9 in which the low melting metal consists of 20 to 30 weight percent of the solid lubricant body, and the solid lubricant powder comprises 70 to 80 weight percent the solid lubricant being of a fineness of from 60 to −350 mesh.

12. The method of claim 9 in which the step of compacting the mixture at about 100° F. occurs at about 50,000 p.s.i. to form the pellet.

13. The method of claim 9 in which the steps of first heating the pellet at about 450° F. for 15 hours, second heating the pellet at about 700° F. for 8 hours, and third heating the pellet at about 950° F. for 8 hours.

14. A low friction member comprising essentially, by weight, a sintered composite product comprising an intimate admixture of (a) from about 80 to 96 percent of at least one finely divided metal selected from the group consisting of copper, silver, and base alloys thereof, and (b) the balance being a gallium-indium alloy wherein gallium comprises about 75% the mixture having been reacted by heating from 300° F. to 1100° F.

References Cited

UNITED STATES PATENTS

| | | | |
|---|---|---|---|
| 2,700,623 | 1/1955 | Hall. | |
| 2,980,475 | 4/1961 | Wolfe | 252—25 |
| 3,141,238 | 7/1964 | Harman | 29—498 |
| 3,288,710 | 11/1966 | Hollitz | 252—25 |
| 3,300,667 | 1/1967 | Boes et al. | 252—25 |
| 3,317,341 | 5/1967 | Buckley et al. | 117—112 |
| 2,686,155 | 8/1954 | Willis et al. | 252—12 |
| 2,855,377 | 10/1958 | Stott | 252—12 |
| 2,998,397 | 8/1961 | Riesing | 252—12 |
| 3,014,865 | 12/1961 | Seniff et al. | 252—12 |
| 3,122,505 | 2/1964 | Rulon-Miller et al. | 252—12 |
| 3,257,317 | 6/1966 | Bre et al. | 252—12 |

DANIEL E. WYMAN, *Primary Examiner.*

I. VAUGHN, *Assistant Examiner.*